2 Sheets—Sheet 1.
F. HOLBROOK, J. A. HOWE & J. NOURSE,
Assignors to J. NOURSE.
Swivel-Plow.
No. 8,551. Reissued Jan. 21, 1879.
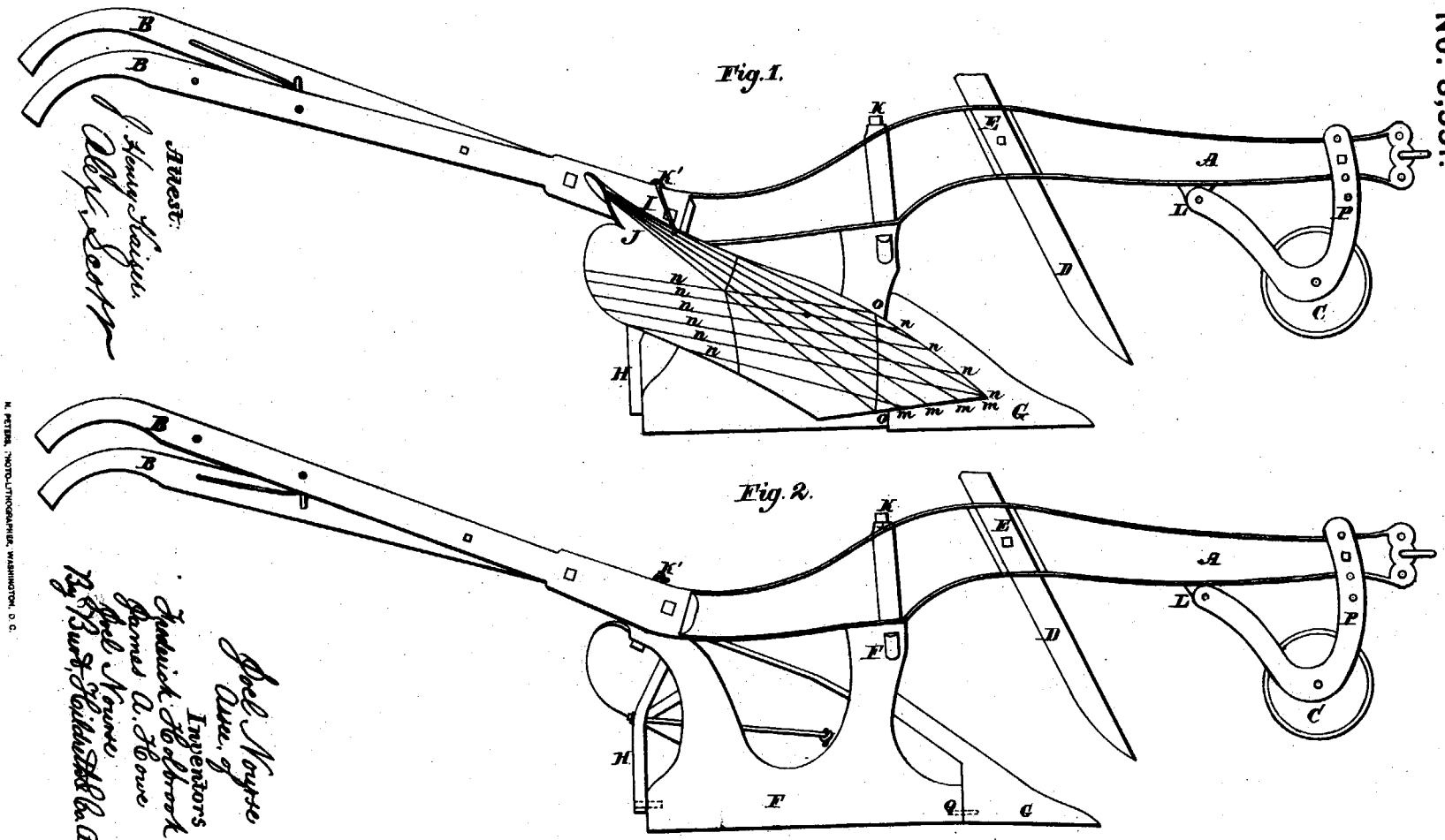
Attest:
J. Henry Kaiser.
Alex. Scott
Joel Nourse
Assee. of
Inventors
Frederick Holbrook
James A. Howe
Joel Nourse
By Burt, Hildreth & Co. Attys.
N. PETERS, PHOTO-LITHOGRAPHER, WASHINGTON, D. C.

2 Sheets—Sheet 2.
F. HOLBROOK, J. A. HOWE & J. NOURSE,
Assignors to J. NOURSE.
Swivel-Plow.
No. 8,551 Reissued Jan. 21, 1879.
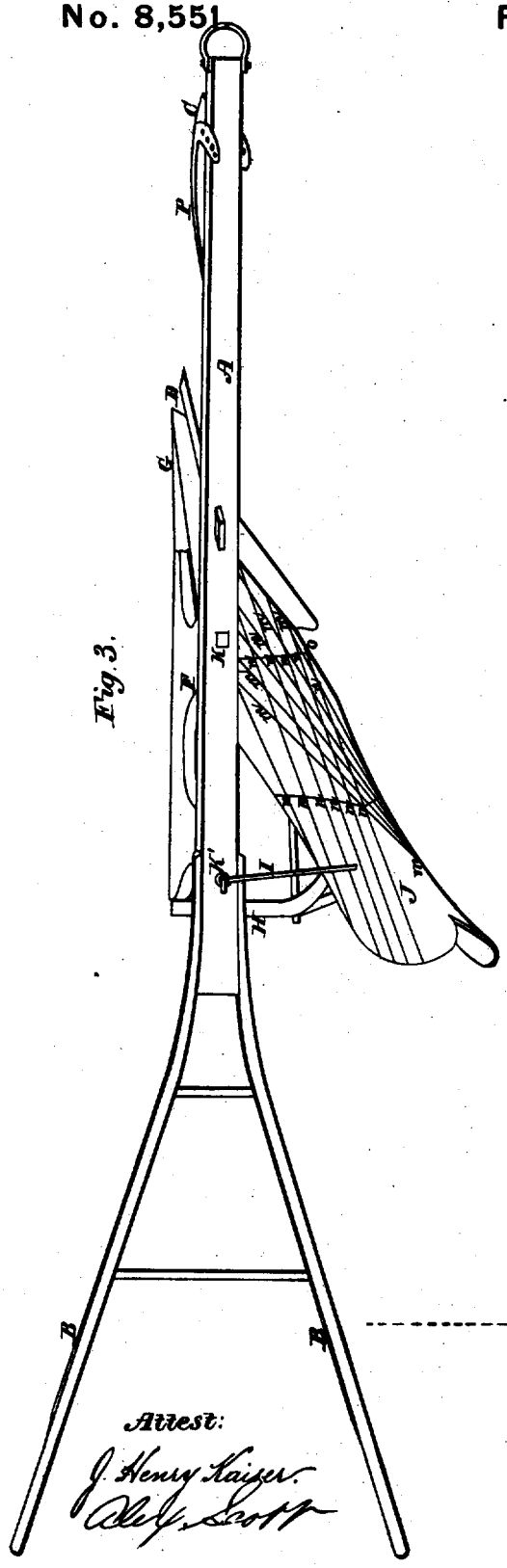
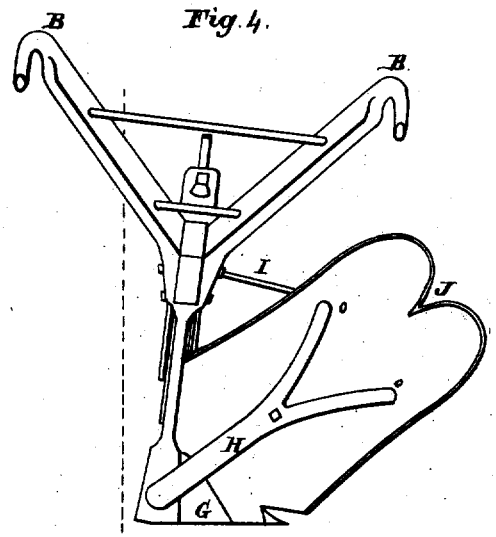
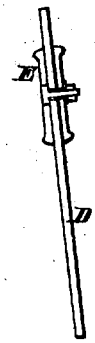
Attest:
J. Henry Kaiser.
Alex. Scott
Joel Nourse
Assee. of
Inventors
Frederick Holbrook
James A. Howe
Joel Nourse
By Burt, Hildreth & Co. Attys.
N. PETERS, PHOTO-LITHOGRAPHER, WASHINGTON, D. C.

UNITED STATES PATENT OFFICE.

JOEL NOURSE, OF BOSTON, MASSACHUSETTS, ASSIGNEE OF FREDERICK HOLBROOK, JAMES A. HOWE, AND JOEL NOURSE.

IMPROVEMENT IN SWIVEL-PLOWS.

Specification forming part of Letters Patent No. 103,187, dated May 17, 1870; Reissue No. 8,551, dated January 21, 1879; application filed December 20, 1878.

*To all whom it may concern:*

Be it known that we, FREDERICK HOLBROOK, of Brattleborough, in the county of Windham, State of Vermont, JAMES A. HOWE, of Boston, in the county of Suffolk, State of Massachusetts, and JOEL NOURSE, of Boston, in the county of Suffolk, State of Massachusetts, have invented a new and Improved Method of Constructing Swivel-Plows; and we do hereby declare that the following is a full and exact description of the construction and operation of the same, reference being had to the accompanying drawings, forming part of this specification, in which—

Figure 1 is a side elevation with the mold-board arranged to turn a furrow to the right. Fig. 2 is a side elevation with the mold-board arranged to turn a furrow to the left. Fig. 3 is a bird's-eye view. Fig. 4 is a rear end elevation. Fig. 5 is a transverse section through the beam and cutter, arranged to turn a furrow to the left.

Since the introduction of mowing-machines it has been found very desirable to avoid the dead-furrow, so called, which results from the use of the common plow. The side-hill plows have been resorted to, but they do not answer the purpose on level land, as they will not turn the furrow over flat or do finished work or thorough plowing, but leave the land rough and in ridges, and they are liable to load or clog, in an adhesive soil, on the concave portion of the mold-board.

The nature of our invention consists, principally, in constructing a swivel-plow in such a manner that, while it is adapted to the plowing of hill-sides in a superior and thorough manner, it will turn a deep, flat furrow on a level surface, will pulverize the soil thoroughly, and at the same time present such a surface to the furrow-slice that it may be turned with the least amount of draft or power, and will run free and not clog or load while being operated in fine loamy or rich adhesive soil.

To enable others skilled in the art to make and use our invention, we will proceed to describe its construction and operation.

A is the beam; B B, the handles; C, the gage-wheel; D, the cutter; E, the bolt that holds the cutter in the beam. F is the land-side and standard. G is the share. H is a swivel-brace. I is the changeable brace. J is the mold-board. K and K′ are bolts that fasten the land-side to the beam. L is a projection on the beam, to which the rear end of the frame P of the gage-wheel C is attached.

We construct the beam, handles, land-side, &c., of any desirable material and convenient form; but we construct the mold-board convex and elliptical, in such a manner that a straight-edge will fit the mold-board along the lines *m* and *n*. (Shown in Figs. 1 and 3.) The mold-board is pivoted to the land-side and standard in the usual manner, and held in its position by means of the swivel Q on the land-side and swivel-brace H and the changeable brace I.

The share and mold-board are confined together with bolts, and so constructed that the standard and land-side stand beveling with the surface of the soil, so as to cut the furrow under on the land-side when it is turning a furrow either to the right or left. This is accomplished by constructing the share and land-side so that, when they are connected, they shall form an angle as much less than a right angle as you wish to cut under the land, and as the share is changed from right to left the standard is relatively changed, and the plow cuts under in both positions the same, as shown in Figs. 3, 4, and 5. To facilitate the cutting under or the beveled cut of the land, the beam and cutter are also inclined, as shown in the drawings.

We make the projection L, on the under side of the beam A, to attach the rear end of the gage-wheel frame P to, and it forms a flexible joint by which the wheel C may be adjusted to the proper depth for the furrow by means of the holes and bolt in the forward end of the wheel-frame. (Shown in Fig. 1.)

The cutter D is fastened to the beam by means of the bolt E. The beam A is provided with a recess to receive the head of the bolt E. The bolt E goes through the cutter and beam. The head of the bolt rests on the cutter. By turning up the nut the cutter is held firmly in its place in the beam. (Shown in Fig. 5.)

Operation: By attaching a team to the plow and moving it forward the share enters the soil to the depth indicated by the gage-wheel, which may be adjusted to the depth required by means of the holes in the wheel-frame P. As the plow moves forward the soil is raised by the share and mold-board until it arrives at the center of the standard at the line O O; and when turning a furrow to the right the resistance and direction of motion of the soil upon the mold-board is shown by the lines *m* in Figs. 1 and 3, and as the plow is propelled onward, the soil having been raised to the point upon the mold-board at the line O O, the mold-board now gives the upper portion of the furrow-slice a lateral and a turning motion. The plow operates the same when turning a furrow to the left, only that the mold-board is reversed, as indicated in Fig. 2.

The plow being constructed so as to cut under or beveling on the land-side, it will readily be seen that this provision facilitates, and, indeed, insures, the laying of flat furrows, as the beveling of the furrows gives abundant room for the turning furrow-slice to fall in flatly beside the previously-turned slice.

The plow is changed from right to left by raising the changeable brace I and turning the mold-board and share, which turns on the swivel Q and the swivel-brace H from one side of the beam to the other, and the plow presents precisely the same features and operates precisely the same on either a left or right hand furrow.

The mold-board being convex, and so constructed that a straight-edge will fit the whole length of the mold-board in the direction of lines *m* and *n*, and leaving in no part of the mold-board a hollow into which an adhesive soil may stick or load, neither presenting any abrupt fullness requiring extra power to propel the plow, it turns the furrow over with the least amount of draft; also, by being convex, it more thoroughly pulverizes the soil, and turns it completely over, leaving a level surface. By the construction as shown it requires less draft to propel the plow, as the mold-board presents to the soil to be plowed a direct straight wedge, over which the soil passes in the direction of the straight lines *m* and *n*.

What we claim as new, and desire to secure by Letters Patent, is—

1. The mold-board of a swivel-plow, forming a regular convex surface in the rear of a cross-section near the front of the standard, the share being concaved between the fins as it approaches the point, and the main body of the mold-board being formed on a series of straight lines, substantially as shown and described, on both sides of the mold-board, in the directions in which the various portions of the furrow-slice pass.

2. The mold-board of a swivel-plow, formed convex at the rear, convex on a cross-section near the front of the standard, straight on a series of lines, substantially as shown and described, on both sides of the mold-board, terminating before reaching the extreme point of the share, and having the fins and point of the share raised above the plane of said lines, thereby forming a concave point.

3. The mold-board for swivel-plows, forming a regular convex surface in the rear of the fins of the share, and constructed on a series of straight lines, substantially as shown and described, running on both sides of the mold-board in the directions in which the various portions of the furrow-slice pass in turning a furrow.

4. The mold-board of a swivel-plow, constructed to form straight lines from near the central portion of the share, diverging to each side of the mold-board to points near the rear lower corners of the same, substantially as shown.

5. The combination of the recess, the bolt E, and cutter with the beam, for the purpose described.

6. The share and land side in swivel-plows, constructed substantially as described, so that when in operation the land-side shall stand on an incline, cutting under the unplowed land in turning a furrow either to the right or left, combined and arranged substantially as described, for the purpose set forth.

JOEL NOURSE,
*Assignee of Inventors.*
FREDERICK HOLBROOK.
JAMES A. HOWE.
JOEL NOURSE.

Witnesses:
EDWIN A. HILDRETH,
HENRY DOW.